Oct. 3, 1944.  G. TILLANDER  2,359,691
MAGNETIC COMPASS
Filed June 15, 1943  2 Sheets-Sheet 1

INVENTOR
G. Tillander
Attorneys

Oct. 3, 1944.   G. TILLANDER   2,359,691
MAGNETIC COMPASS
Filed June 15, 1943   2 Sheets-Sheet 2
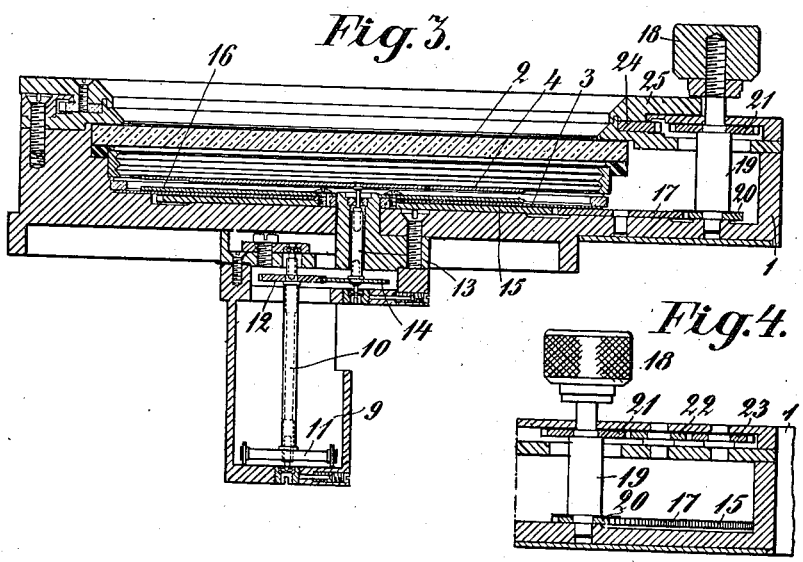
INVENTOR
G. Tillander
Attorneys Patented Oct. 3, 1944

2,359,691

UNITED STATES PATENT OFFICE 2,359,691

MAGNETIC COMPASS

Gunnar Tillander, Langangen, Stocksund, Sweden

Application June 15, 1943, Serial No. 490,830
In Sweden September 2, 1942

4 Claims. (Cl. 33—222)

The present invention relates to a device for facilitating the taking of bearings by compasses (especially on air craft) that are provided with a compass-needle playing over a stationary compass-rose and actuated by a magnetic system over a gear transmission and with an auxiliary device (pointer, index or the like) being manually adjustable in relation to the compass-needle and adapted to facilitate the setting and maintenance of the desired course by bringing the direction of the compass-needle to coincide with that of the auxiliary device.

It is difficult to take the bearings by means of such compasses. This difficulty occurs both with horizontal as well as and still more with vertical compass-needles, but may be eliminated according to the invention by means of a horizontally arranged rotatable compass-scale, which is so connected to said auxiliary device that after adjusting the auxiliary device to the desired course and making the direction of the compass-needle coincide with that of the auxiliary device, said compass scale will give the desired bearing and directly indicate the course.

In compasses with horizontal needle said rotatable compass scale is suitably formed as a ring that is rotatable about the stationary compass-rose, and in compasses with vertical needle said compass scale should be arranged as a horizontal rotatable disc.

An embodiment of a compass according to the invention is illustrated by way of example on the accompanying drawings.

Fig. 3 shows on a larger scale a portion of the compass in section along the line II—II of Fig. 1.

Fig. 4 shows a fragmentary sectional view on a larger scale along the line IV—IV in Fig. 1.

Figure 1:
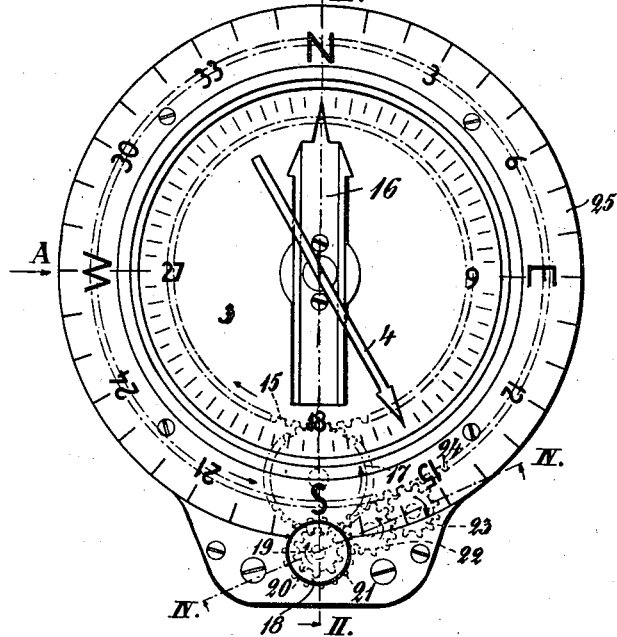
Fig. 1 is a plan view of the compass.
Figure 2:
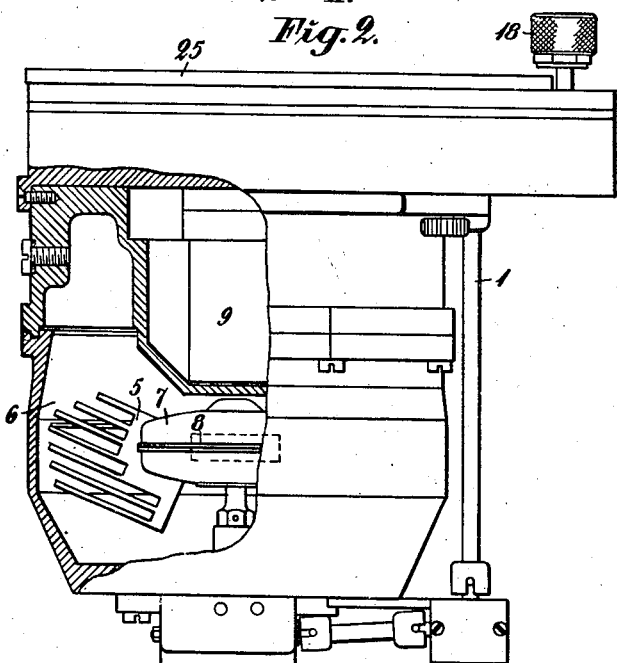
Fig. 2 is an elevational view of the same seen in the direction of the arrow A in Fig. 1 and being partly in section along the line II—II in Fig. 1.

The compass casing 1 being secured to an instrument board and thus participating in all the motions of the craft is provided with a window 2 through which are visible a stationary compass-rose 3 divided in units of direction and above the compass-rose a non-magnetic pointer needle 4.

In a chamber 6 filled with liquid and provided with damping wings 5 a magnet 8 (the main magnet) is provided in a float suspended on the point of a needle. Above the float 7 and thus also above the main magnet 8 a second magnet 11 (follower magnet) is fixed on a shaft 10 pivotally journalled in a chamber 9 in the casing 1, which magnet follows the pivoting motions of the main magnet 8. On the axis 10 a gear 12 is fixed being in mesh with a gear 14 fixed on a rotatably journalled axis 13 on which also the needle 4 is secured.

Through the window 2 is also visible an auxiliary pointer 16 arranged below the needle 4 and fixed to a gear 15. The gear 15 is in mesh with a gear 17 which is in mesh with a gear 20 fixed on the lower end of an axis 19 that is rotatable by means of a button 18 so that when rotating the button 18 the auxiliary pointer 16 is also rotated. At the upper end of the axis 19 a gear 21 is also secured, which gear over intermediary gears 22, 23 is connected to an annular gear 24, which is secured to a rotatable ring 25 that is arranged above the window 2 and is concentric with the compass-rose 3. The ring 25 is also divided in units of direction. Consequently, when the button 18 is rotated, the ring 25 is also turned, the gear ratio between the sets of gears 15, 17, 20 and 21, 22, 23 being so selected that the auxiliary pointer 16 and the ring 25 will be rotated equal angles but in opposite directions.

The described compass is to be operated in the following manner:

It may be supposed that the craft is moving north, the point of the needle 4 pointing north and to the letter N of the ring 25. If now the course is to be changed to east, the auxiliary pointer 16 is turned 90° to the right by means of the button 18 until it points east. At this rotation 90° to the right of the pointer 16 the ring 25 has simultaneously also been rotated 90° but to the left so that the letter E of the ring 25 now occupies the place where the letter N previously was standing.

Thereupon the craft is steered to the right until the point of the needle 4 coincides with the point of the pointer 16. Then the craft is moving exactly east, and the compass gives the bearing, as the letter E of the ring 25 giving the bearing really indicates the right course east. If the ring 25 was omitted and thus only the stationary compass-rose 3 was to be used, the letter N of the same would always point right forwards, also when the craft has been turned east. This would give the impression that the craft was not moving east but north, which circumstance of course makes the taking of the bearing much more difficult. Such an impression cannot arise if on the ring 25 according to the invention the same course may be read in the direction of motion of the craft as the craft actually has.

Without surpassing the scope of the invention, the described auxiliary pointer 16 may for example be replaced by an index or the like being movable along the circumference of the compass-rose, with which index the needle 4 is to be made to coincide.

Having now particularly described the nature of my invention and the manner of its operation what I claim is:

1. A compass comprising a magnetic system, a stationary compass-rose, a non-magnetic pointer-needle rotatable in a plane parallel to said compass-rose for indication thereover, a transmission gear connecting said magnetic system to said pointer-needle, an auxiliary indicator adjustable with relation to said pointer-needle along the scale of said compass-rose, a manually operable member, a transmission gear connecting said auxiliary indicator with said manually operable member, a normally horizontal rotatable auxiliary compass scale, and a transmission gear connecting said auxiliary compass scale with said manually operable member whereby said auxiliary indicator and said auxiliary compass scale may be simultaneously rotated by said manually operable member.

2. A compass comprising a magnetic system, a stationary compass-rose, a non-magnetic pointer-needle rotatable in a plane parallel to said compass-rose for indication thereover, a transmission gear connecting said magnetic system to said pointer-needle, an auxiliary indicator adjustable with relation to said pointer-needle along the scale of said compass-rose, a manually operable member, a transmission gear connecting said auxiliary indicator with said manually operable member, a normally horizontal rotatable auxiliary compass scale, and a transmission gear connecting said auxiliary compass scale with said manually operable member, the transmission gears related to the auxiliary indicator and the auxiliary compass scale being so constructed and arranged that they are rotated simultaneously through equal angles and in opposite directions by manipulation of said manually operable member.

3. A compass as claimed in claim 1, in which the pointer-needle and the compass-rose are normally horizontally arranged and said auxiliary compass scale is formed as a ring surrounding said compass-rose.

4. A compass as claimed in claim 2, in which the pointer-needle and the compass-rose are normally horizontally arranged and said auxiliary compass scale is formed as a ring surrounding said compass-rose.

GUNNAR TILLANDER.